United States Patent
Billieres et al.

(10) Patent No.: US 7,329,467 B2
(45) Date of Patent: Feb. 12, 2008

(54) CERAMIC ARTICLE HAVING CORROSION-RESISTANT LAYER, SEMICONDUCTOR PROCESSING APPARATUS INCORPORATING SAME, AND METHOD FOR FORMING SAME

(75) Inventors: Dominique Billieres, Avignon (FR); Matthew Simpson, Sudbury, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 430 days.

(21) Appl. No.: 10/646,235

(22) Filed: Aug. 22, 2003

(65) Prior Publication Data

US 2005/0042483 A1    Feb. 24, 2005

(51) Int. Cl.
*B32B 9/00* (2006.01)
(52) U.S. Cl. ............. 428/701; 428/697; 428/699; 428/702; 427/422; 427/376.1
(58) Field of Classification Search ............. 428/701, 428/702, 699, 697, 332, 323, 336
See application file for complete search history.

(56) References Cited

U.S. PATENT DOCUMENTS

| | | | |
|---|---|---|---|
| 3,968,303 A * | 7/1976 | Harris ............ 428/332 |
| 5,422,322 A | 6/1995 | Chen et al. |
| 5,798,016 A | 8/1998 | Oehrlein et al. |
| 6,379,789 B1 | 4/2002 | Crowley et al. |
| 6,620,520 B2 * | 9/2003 | O'Donnell et al. ....... 428/469 |
| 6,939,607 B2 * | 9/2005 | Kato et al. .............. 428/336 |
| 2001/0003271 A1* | 6/2001 | Otsuki .............. 118/723 I |
| 2002/0018921 A1 | 2/2002 | Yamada et al. |
| 2003/0029563 A1 | 2/2003 | Kaushal et al. |
| 2003/0059653 A1 | 3/2003 | Yamada et al. |
| 2004/0067392 A1* | 4/2004 | Yamada et al. .......... 428/702 |

FOREIGN PATENT DOCUMENTS

| | | |
|---|---|---|
| EP | 0 604 096 B1 | 4/1996 |
| EP | 1 158 072 A2 | 11/2001 |
| EP | 1 239 055 A2 | 9/2002 |
| EP | 1 245 696 A2 | 10/2002 |
| JP | 02-080270 | 3/1990 |
| JP | 9-235685 | 9/1997 |
| JP | 9-295863 | 11/1997 |
| JP | 10-4083 | 1/1998 |
| JP | 10-45461 | 2/1998 |
| JP | 10-45467 | 2/1998 |
| JP | 10-67554 | 3/1998 |
| JP | 10-236871 | 9/1998 |
| JP | 10-330150 | 12/1998 |

(Continued)

*Primary Examiner*—Jennifer C. McNeil
*Assistant Examiner*—Gordon R. Baldwin
(74) *Attorney, Agent, or Firm*—Larson Newman Abel Polansky & White, LLP

(57) ABSTRACT

An article is provided that includes a substrate and a corrosion-resistant coating provided on the substrate. The substrate generally consists essentially of alumina, and the corrosion-resistant coating is provided so as to directly contact the substrate without the provision of intervening layers between the substrate and the corrosion-resistant coating, such as reaction products provided by high-temperature treatment processes. The corrosion-resistant coating generally consists essentially of a rare earth oxide, and has an adhesion strength not less than about 15 MPa. According to particular embodiments, the article is a ceramic component utilized and implemented in a semiconductor processing apparatus for processing semiconductor wafers.

13 Claims, 3 Drawing Sheets

FOREIGN PATENT DOCUMENTS

| | | |
|---|---|---|
| JP | 11-102900 | 4/1999 |
| JP | 11-157916 | 6/1999 |
| JP | 11-214194 | 8/1999 |
| JP | 11-251093 | 9/1999 |
| JP | 11-278944 | 10/1999 |
| JP | 11-279761 | 10/1999 |
| JP | 2000-1362 | 1/2000 |
| JP | 2000-103689 | 4/2000 |
| JP | 2001-031484 | 2/2001 |
| JP | 2002-356387 A | 12/2002 |

* cited by examiner

CERAMIC ARTICLE HAVING CORROSION-RESISTANT LAYER, SEMICONDUCTOR PROCESSING APPARATUS INCORPORATING SAME, AND METHOD FOR FORMING SAME

BACKGROUND

1. Field of the Invention

The present invention is generally directed to ceramic articles, semiconductor wafer processing apparatuses incorporating ceramic articles, semiconductor wafer processing, and methods for forming ceramic articles.

2. Description of the Related Art

In many industries, it is generally desirable to provide components having certain requisite thermal, mechanical, electrical, and chemical properties. Particularly in the area of semiconductor processing, certain properties can be of marked importance in the successful processing of semiconductor wafers to form active semiconductor devices with high yield rates. In connection with semiconductor processing, it is well understood that various processes take place to form active semiconductor components, such as logic devices and memory devices contained within individual ceramic die of a processed semiconductor wafer. Such processing operations include implant and diffusion, photolithography, film deposition, planarization, test, and assembly (packaging). In connection with the foregoing general processing operations in the semiconductor industry, processing operations such as photolithography typically utilize selected gaseous reactants that are employed to remove material from the semiconductor wafer. Such processes may be utilized to remove selected portions of a deposited layer (such as in photolithography), the entirety of a deposited layer, or to generally clean a wafer or work piece. A certain species of these processes include what is known as etching.

Etching processes typically employ fairly highly reactive gas species, many times relying upon halogen species gases. An ongoing problem in the semiconductor wafer processing industry is implementation of semiconductor processing tools that have adequate chemical resistance to such species, particularly at elevated temperatures. In this regard, it has been found that components used in certain semiconductor processing tools, such as etch chambers, tend to corrode causing increases in particle counts during processing. As is well understood in the art, it is typically desirable to minimize generation of particles in such controlled environments, as particles negatively impact semiconductor yield.

Accordingly, in view of the foregoing, it is generally desirable to provide improved ceramic components having corrosion resistance, which may find particular use in the semiconductor industry, as well as improved semiconductor processing apparatuses, methods for processing wafers, and methods for processing ceramic components.

SUMMARY

According to a first aspect of the invention, an article is provided that includes a substrate and a corrosion-resistant coating provided on the substrate. The substrate generally consists essentially of alumina, and the corrosion-resistant coating is provided so as to directly contact the substrate without the provision of intervening layers between the substrate and the corrosion-resistant coating, such as reaction products provided by high-temperature treatment processes. The corrosion-resistant coating generally consists essentially of a rare earth oxide, and has an adhesion strength not less than about 15 MPa. According to particular embodiments, the article is a ceramic component utilized and implemented in a semiconductor processing apparatus for processing semiconductor wafers.

According to another aspect of the present invention, a semiconductor wafer processing apparatus is provided that includes a chamber being at least partially defined by a chamber wall, the chamber wall comprising mainly a ceramic base material. Further, a corrosion-resistant layer lines the chamber wall and directly contacts the ceramic base material, the corrosion-resistant layer consisting essentially of a rare earth oxide and having an adhesion strength of not less than about 15 MPa. Further, a support for supporting a semiconductor wafer in the chamber is provided. Unless otherwise noted herein, the term "rare earth" oxide generally denotes the lanthanide series elements, as well as yttrium and scandium.

According to another aspect of the present invention, a method for processing semiconductor wafers is provided, which includes placing a semiconductor wafer in a processing apparatus provided in accordance with the features described above, and subjecting the semiconductor wafer to a processing operation, including introducing at least one processing gas into the chamber for reaction with the wafer. The processing operation may include additional steps such as dicing the semiconductor die into individual die to form semiconductor devices, followed by packaging.

According to another aspect of the present invention, a method for forming a ceramic article is provided, wherein a substrate is pre-heated to a temperature of not less than about 200° C., the substrate consisting essentially of alumina, and thermally spraying a rare earth oxide layer on the substrate, the rare earth oxide having an adhesion strength of not less than about 15 MPa.

DETAILED DESCRIPTION

Figure 1:
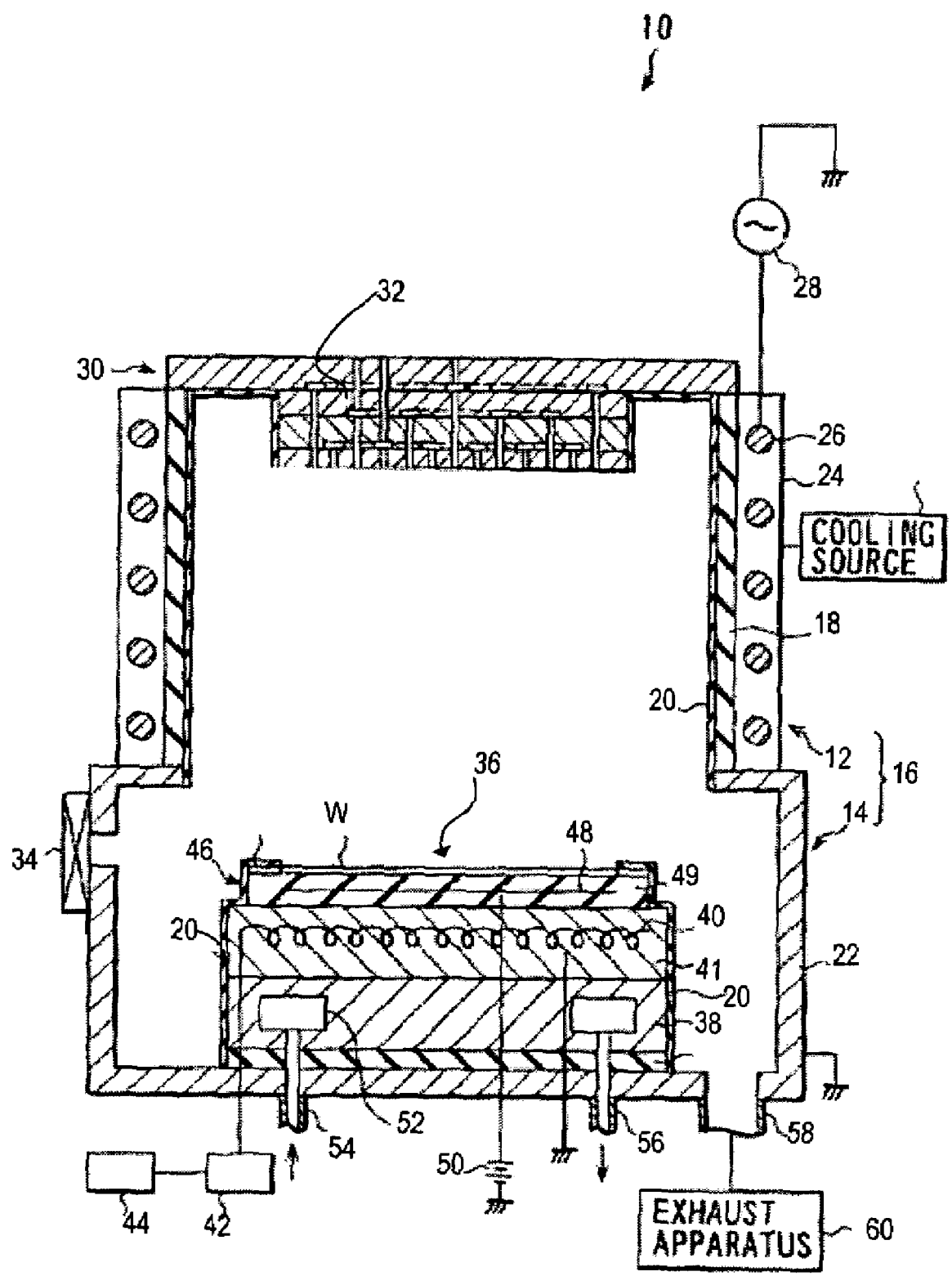
FIG. 1 illustrates a semiconductor processing apparatus according to an embodiment of the present invention.

According to a first aspect of the present invention, a semiconductor processing apparatus for processing semiconductor wafers is provided. The apparatus may be particularly configured to receive various gaseous species for reaction with a semiconductor wafer provided within a chamber of the apparatus, and the apparatus may be utilized for cleaning, etching, deposition processing, among others. Turning to FIG. 1, an embodiment is illustrated, apparatus 10 including a chamber 16 formed of an upper chamber and a lower chamber 12, 14, respectively. The chamber defines therein an internal volume in which the processing steps take place. Generally speaking, the chamber 16 is defined by chamber walls. As used herein, the terms "chamber walls" or "walls" are used generally, to denote the structure defining the internal volume of the processing apparatus, and may include generally vertical walls or sidewalls, and generally horizontal walls such as a lid or floor. The upper chamber 12 includes a sidewall 18, which, together with showerhead 30 forming a lid portion of the upper chamber 12, defines an internal processing volume of the upper chamber 12. According to a particular feature of this embodiment, the sidewall 18 includes a layer 20 deposited thereon. Layer 20 is a corrosion-resistant layer, and is described in more detail hereinbelow.

Depending upon the particular processing operations to be carried out, a coil 26 is provided so as to generally surround the sidewall 18, the coil 26 being connected to high-frequency power source 28, for generation of a high-frequency electromagnetic field. Further, optionally, a cooling mechanism 24 is connected to a cooling source to aid in temperature control within the upper chamber 12.

According to another particular feature of the embodiment, at least one gas inlet 32 is provided so as to be in gaseous communication between the chamber 16 and an outside gas source (not shown), which may include a reactant gas for semiconductor processing. In the particular embodiment shown on FIG. 1, a plurality of gas inlets are provided through a multilayered structure referred to herein as showerhead 30.

Turning to the lower chamber 14, a wafer support 36 is generally provided within lower chamber wall 22. As shown, the wafer support 36 is provided so as to support and position wafer W, which may be brought into the apparatus 10 through opening gate 34. The wafer support 36 generally has a chucking feature, and in this case, includes electrostatic chuck 46. As is generally understood in the art, an electrostatic chuck provides an electrostatic attraction force by putting an embedded electrode at a desired potential. In this case, embedded electrode 48 is biased via DC power source 50 to provide the desired electrostatic chucking force on wafer W. Further, a wafer support 36 also generally includes a heating element 40 embedded in heating layer 41, the heating element being connected to a power source 42 and controller 44 for maintaining the wafer W at a desired temperature, which is dependent upon the particular processing operation taking place. Further, the support base 38 includes coolant chamber 52, which may have an annular cross-section (as viewed in the plane perpendicular to the plane of FIG. 1), being in fluid communication with coolant intake 54 and coolant exhaust 56, for flow of coolant fluid through the coolant chamber 52.

According to a particular feature shown in FIG. 1, the layer 20 may extend so as to cover not only sidewall 18 of upper chamber 12, but also the wafer support 36, and the lid portion of the upper chamber 12 formed by showerhead 30. Although not shown in the drawing, an interior barrier wall may be provided in the space between the lower chamber wall 22 and the wafer support 36. This interior barrier wall, also known as a liner, may be desirably formed of a robust ceramic material, generally including a base material such as the ceramic base material utilized for sidewall 18, and further, coated with corrosion-resistant layer 20.

In operation, typically the semiconductor wafer is loaded through gate 34 and placed onto wafer support 36 and positioned thereon by the electrostatic chucking force provided by electrostatic chuck 46. In operation, oftentimes an electromagnetic field is generated by the coil 26, and at least one reactant gas is flowed into the chamber through at least one of the gas inlets 32.

As to the particulars of the processing operation, as noted above, the operation may be an etching, cleaning or deposition process, any one of which may utilize desirable reactant species, some of which have generally corrosive properties. In this regard, exemplary etching gases are shown below in Table 1.

TABLE 1

| Material Being Etched | Chemistry I | | Chemistry II |
|---|---|---|---|
| PolySi | $Cl_2$ or $BCl_3$ / $CCl_4$ / $CF_4$ / $CHCl_3$ / $CHF_3$ | sidewall passivating gases | $SiCl_4/Cl_2$ $BCl_3/Cl_2$ $HBr/Cl_2/O_2$ $HBr/O_2$ $Br_2/SF_6$ $SF_6$ $CF_4$ |
| Al | $Cl_2$ $BCl_3$ + sidewall passivating gases $SiCl_4$ | | $SiCl_4/Cl_2$ $BCl_3/Cl_2$ $HBr/Cl_2$ |
| Al-Si(1%)-Cu(0.5%) Al-Cu(2%) | Same as Al BCla/Cla/CHFa | | $BCl_3/Cl_2 + N_2$ $BCl_3/Cl_2 + N_2 + Al$ |
| W | $SF_6/Cl_2/CCl_4$ | | $SF_6$ only $NF_3/Cl_2$ |
| TiW | $SF_6/Cl_2/O_2$ | | $SF_6$ only |
| $WSi_2$, $TiSi_2$, $CoSi_2$ | $CCl_2F_2$ | | $CCl_2F_2/NF_3$ $CF_4/Cl_2$ |
| Single crystal Si | $Cl_2$ or $BCl_3$ + sidewall passivating gases | | $CF_3Br$ $HBr/NF_3$ |
| $SiO_2$ (BPSG) | $CCl_2F_2$ $CF_4$ $C_2F_6$ $C_3F_8$ | | $CCl_2F_2$ $CHF_3/CF_4$ $CHF_3/O_2$ $CH_3/CHF_2$ |
| $Si_3N_4$ | $CCl_2F_2$ $CHF_3$ | | $CF_4/O_2$ $CF_4/H_2$ $CHF_3$ $CH_3CHF_2$ |
| GaAs | $CCl_2F_2$ | | $SiCl_4/SF6$ /NF3 /CF4 |
| InP | None | | $CH_4/H_2$ HI |

As generally shown in Table 1, various gaseous chemistries may be utilized for etching of different materials that are commonly employed in semiconductor processing, many of which have corrosive properties, including the halogen-containing gases such as the chlorine- or fluorine-based gases. The column entitled Chemistry I generally denotes conventionally used chemistries, while Chemistry II represents newer generation chemistries more commonly found in modem semiconductor processing. It is also noted that introduction of new materials in the semiconductor fabrication process such as low-K dielectrics, high-K dielectrics, and copper may also require use of new and/or additional chemistries.

Figure 2:
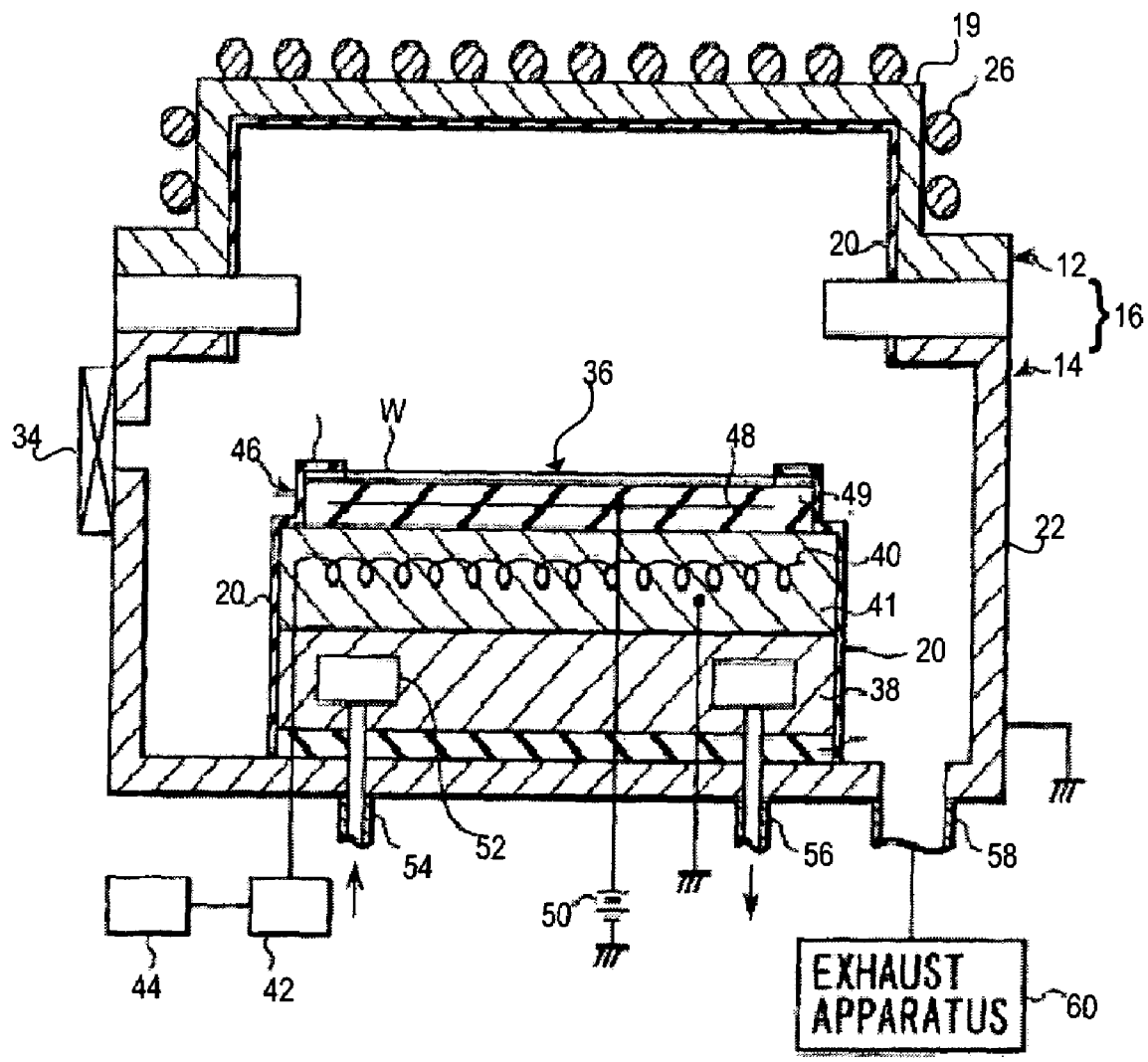
FIG. 2 illustrates a semiconductor processing apparatus according to another embodiment of the present invention.

FIG. 2 illustrates another embodiment, generally similar to FIG. 1, but having a different contour for the upper chamber 12. In this regard, the components similar to those shown in FIG. 1 are labeled with the same reference numerals, and a detailed discussion is not provided. However, in the apparatus shown in FIG. 2, the upper chamber 12 is generally defined by lid 19, extending generally horizontally, with short vertical sidewalls. This lid 19, forming a wall of the chamber, is coated with corrosion-resistant coating 20. In addition, gases are generally introduced through the gas inlets 100, as represented by the arrow labeled G.

Figure 3:
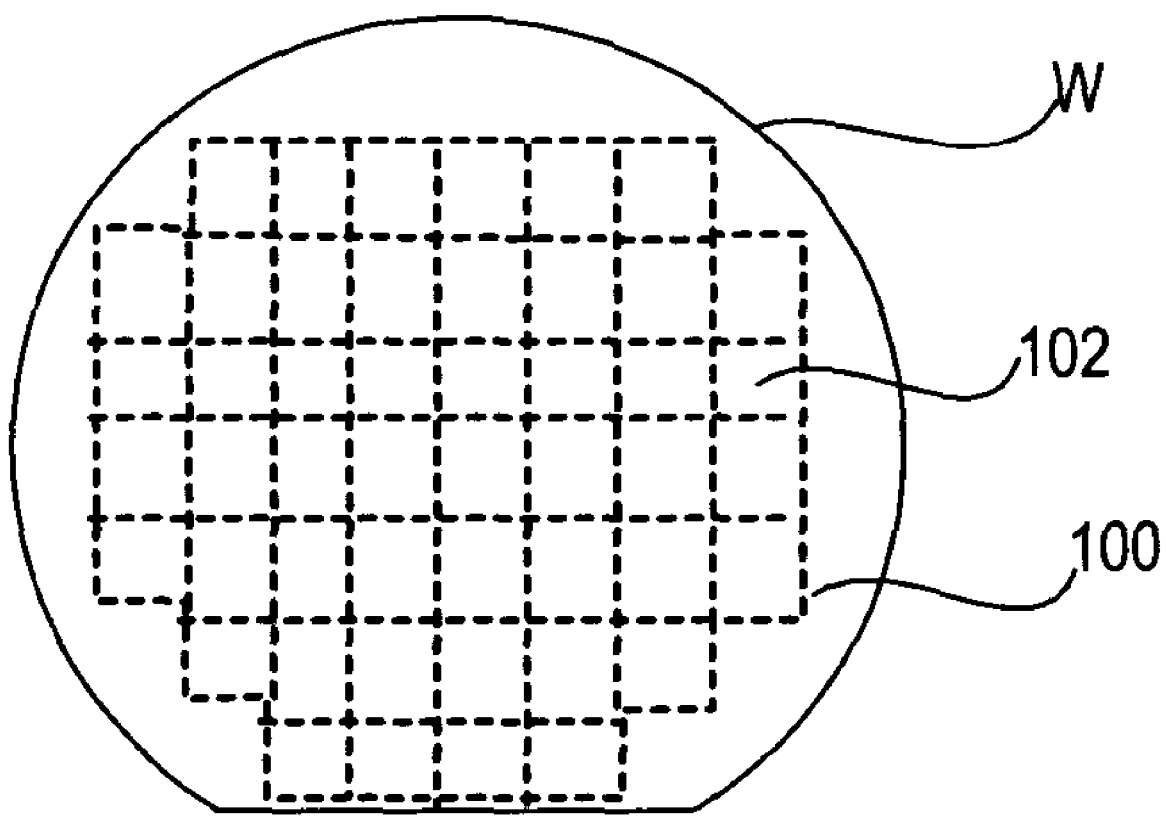
FIG. 3 illustrates dicing of semiconductor die of a semiconductor wafer.

Following processing of the semiconductor wafer in the processing apparatus described herein, the wafer may be subjected to additional processing steps, which may include any one of the general process operations described in the background, such as deposition, planarization, further photolithographic and etching processing operations. Upon completion of wafer processing, the wafer is generally diced into individual semiconductor die. This operation is illustrated in FIG. 3, illustrating wafer W, which is diced into individual die 102 by scribing along scribe lines 100. Following the dicing operation, the individual die are generally packaged such as in a flip-chip package, plastic encapsulated package, a pin-grid or a ball-grid array package, or any one of the various packages known in the art, including multi-chip modules (MCMs). The packaged semiconductor die, forming active semiconductor components, may be then incorporated into electronic devices. Generally speaking, the semiconductor devices contain at least one of logic circuitry and memory circuitry, respectively forming logic devices and memory devices.

As noted above, according to a particular feature of an embodiment of the present invention, at least some portion of the chamber of the processing apparatus is defined by a ceramic member coated with a corrosion-resistant liner. In the case of FIGS. 1 and 2, the ceramic members are represented by sidewall 18 and lid 19, respectively, each coated with corrosion-resistant layer 20. The base material of the ceramic member forming the lid 19 or sidewall 18 may be any one of various ceramic materials, including alumina, silica, and aluminum nitride. However, according to a particular embodiment, the ceramic base material is formed principally of alumina, and in particular alpha-alumina (corundum).

In the case of the layer 20, an appropriate corrosion-resistant material is utilized. Typically, the corrosion-resistant material is formed of a rare earth oxide. In one embodiment, the layer 20 consists essentially of a rare earth oxide. As used herein, description of "consisting essentially of" in connection with the rare earth oxide of the corrosion-resistant layer generally indicates that at least 80 wt. % of the layer is formed of the rare earth oxide, more typically, at least about 90 wt. %, and in certain embodiments, greater than 95 wt. %. Further, as used herein, the term "rare earth" includes not only the lanthanide series elements, but also yttrium and scandium as well. According to a particular embodiment, a particular rare earth is yttrium (Y), thereby forming a corrosion-resistant layer consisting essentially of $Y_2O_3$.

According to another aspect of the present invention, the corrosion-resistant layer 20 is formed on the underlying ceramic substrate (in the case of FIGS. 1 and 2, the ceramic sidewall 18 or lid 19, respectively) by a thermal spraying process. In this regard, the substrate on which the corrosion-resistant layer is deposited, is generally pre-heated to a temperature not less than about 200° C., desirably 250° C. or greater, and in some embodiments, 275° C. or even 300° C. or greater. Thermal spraying of the corrosion-resistant layer is then carried out while the substrate is heated to the above-described temperature. It was found that the thermally sprayed corrosion-resistant layer demonstrates superior adhesion strength, having an adhesion of not less than about 15 MPa, typically greater than 20 MPa and in certain embodiments not less than about 25 MPa, and not less than about 30 MPa.

It is noted that while much of the foregoing has focused on varying configurations of ceramic members at least partially defining a processing apparatus for semiconductor processing, the above-described substrate/corrosion-resistant layer structure may be incorporated for generalized ceramic structures for various applications. In this regard, the substrate on which the corrosion resistant layer is deposited may take on various geometric configurations for various corrosion-resistant applications.

Further, it was found that in the particular case of a substrate consisting essentially of alumina, a rare-earth corrosion-resistant layer may be deposited with high adhesion strength, as described above. This is particularly beneficial, as it is generally difficult to deposit rare earth oxide layers such as yttria on alumina substrates. In this regard, the prior art has generally relied upon the use of various intralayer structures, either a graded alumina/yttria interlayer, several composite intralayers, or a thermally reacted interlayer formed by deposition of a yttria layer on alumina substrate followed by thermal treatment at an elevated temperature to form a reaction product. This reaction product forms a discernable layer between the deposited yttria layer and the underlying substrate.

According to embodiments of the present invention, the generally required interlayers may be eliminated without adversely affecting the adhesion strength between the deposited layer and the underlying substrate. Furthermore, it has been found that the as-deposited layer may have residual stresses and microcracks, both of which are toughening mechanisms to increase the toughness and reduce the brittleness of the deposited layer. In contrast, thermally-treated yttria layers, such as those generally described in US Patent Application Publication 2002/0018921 A1, published Feb. 14, 2002, generally have reduced residual stresses and microcracks, as evidenced by diffraction analysis, indicating generally higher brittleness of such thermally treated yttria layers.

Additional features will be made clearer in connection with the discussion of particular examples described below.

EXAMPLES

Multiple examples were manufactured in accordance with the thermal spray parameters described in Table 2 below.

TABLE 2

| Designation | Yttria Spray Parameters 2C |
|---|---|
| Chemical compo. | UHP Y$_2$O$_3$ |
| Size range | μ −63 +10 |
| Powder morphology | Spray dried |
| Argon (l/min) | 43 |
| Hydrogen (l/min) | 9 |
| Intensity (A) | 590 A |
| Voltage (V) | 68-72 |
| Spraying dist. (mm) | 105 mm |
| Gun/Anode | TS7 - 16052313 W lined |
| Ø feeding injector | 1.5 |
| Feeding angle. | 90° |
| Feed inj distance | 5 mm |
| Powder carrier gas (l/min) | 11 ± 1 l/min |
| Powder feeding (g/min) | 25 |
| Gun linear speed | 400 mm/s |
| Step increment (mm/tr) | 0.8 mm for 100 μm thickness (adjusted for other thicknesses) |

The samples were created by executing the thermal spray operation in accordance with the foregoing parameters, on multiple alpha-alumina (corundum) substrates, machined with 80-grit abrasive, to a nominal surface roughness R$_a$ of 1.7 microns.

Tables 3 and below summarize the fracture strength and localization of numerous samples formed in accordance with the foregoing process conditions.

TABLE 3

| SAMPLES | COATING THICKNESS | FRACTURE STRENGTH (MPa) | FRACTURE LOCALIZATION |
|---|---|---|---|
| No preheat ||||
| 1 | 150 μm | 2 | 100% interface |
| 2 | 150 μm | 2 | 100% interface |
| 3 | 150 μm | 5 | 100% interface |
| 4 | 150 μm | 14 | 10% inside coating, 90% interface |
| Mean value | | 5.75 | |
| 100 C. preheat ||||
| 5 | 150 μm | 4 | 100% interface |
| 6 | 150 μm | 4 | 100% interface |
| 7 | 150 μm | 4 | 100% interface |
| 8 | 150 μm | 5 | 100% interface |
| Mean Value | | 4.25 | |
| 200 C. preheat ||||
| 9 | 150 μm | 20 | 100% interface |
| 10 | 150 μm | 25 | 100% interface |
| 11 | 150 μm | 7 | 10% inside coating, 90% interface |
| Mean value | | 17.3 | 1 weak sample (25.7 without it) |

TABLE 4

| SAMPLES | COATING THICKNESS | FRACTURE STRENGTH (MPa) | FRACTURE LOCALIZATION |
|---|---|---|---|
| 200 C. preheat ||||
| 12 | 90-100 μm | 13 | 90% interface substrate/coating - 10% glue |
| 13 | 90-100 μm | 9 | 80% interface substrate/coating - 20% glue |
| 14 | 90-100 μm | 17 | 85% interface substrate/coating - 15% glue |
| 15 | 90-100 μm | 9 | 80% interface substrate/coating - 20% glue |
| 16 | 90-100 μm | 25 | 30% interface substrate/coating - 70% glue |
| Mean value | | 14.6 | |
| 300 C. preheat ||||
| 17 | 100-105 μm | 34 | 40% interface subst/coating - 60% in the glue |
| 18 | 100-105 μm | 18 | 80% interface subst/coating - 20% in the glue |
| 19 | 100-105 μm | 46 | 45% interf. subst/coating - 15% glue - 40% in coatg |
| 20 | 100-105 μm | 33 | 45% interf. subst/coating - 10% glue - 45% in coatg |
| 21 | 100-105 μm | 24 | 50% interface subst/coating - 50% in the coating |
| Mean value | | 31 | |

As can be seen clearly from the foregoing data, working examples pre-heated were found to provide enhanced adhesion of the thermally sprayed yttria film.

Further, another comparative example was created to demonstrate the toughness of an example created according to the teachings herein, as compared to a thermally treated deposited coating to form an intervening reaction layer, in general accordance with the '921 publication. An as-sprayed sample and another sample after heat treatment at 1,500° C. for three hours (to form an intervening reaction layer) were subjected to diffraction analysis. Diffraction analysis was carried out by utilizing an XRG-3100 generator with a copper tube and a graphite monochromator coupled to an APD-3720 diffraction system by Phillips of Eindhoven, Holland. The data were analyzed using Phillips PC-APD software Version 3.6j utilizing a Marquardt non-linear least squares fitting routine. The as-sprayed sample had a 0.220 width of (440) α$_1$ peak in degrees, while the heat-treated sample had a 0.155 width of (440) $\alpha_1$ peak. The increased width of the 440 $\alpha_1$ peak for the as-sprayed sample indicates that the sample generally contains a higher degree of inhomogeneous residual stress, increasing tolerance to damage and increasing general toughness through residual stresses and microcracking.

Further examples were created by grit blasting alpha-alumina cylinders with 46-grit to a surface roughness of about 2 microns $R_a$. Pre-heating was carried out at 400° and thermal spraying was carried out in accordance with the foregoing spray parameters. Adhesion strengths were generally within a range of about 37-75 MPa.

While embodiments of the present invention have been described above with particularity, it is well understood in the art that one of ordinary skill may make modifications and still be within the scope of the present claims.

What is claimed is:

1. A ceramic article, comprising:
   a substrate consisting essentially of alumina; and
   a corrosion-resistant coating provided on the substrate and comprising at least 80 wt. % yttria, the corrosion-resistant coating directly contacting the substrate such that the ceramic article is free of intervening layers, including thermally reacted interlayers, between the substrate and the corrosion-resistant coating, the corrosion-resistant coating having an adhesion strength not less than 20 MPa.

2. The ceramic article or claim 1, wherein the corrosion-resistant coating comprises at least 90 wt. % yttria.

3. The ceramic article of claim 2, wherein the corrosion-resistant coating comprises at least 95 wt. % yttria.

4. The article of claim 1, wherein the ceramic article comprises a component of a semiconductor processing apparatus.

5. The article of claim 4, wherein the component is a chamber wall.

6. The article of claim 5, wherein the component is a chamber lid.

7. The article of claim 5, wherein the component is a chamber sidewall.

8. The article of claim 1, wherein the corrosion resistant layer has an adhesion strength of not less than 25 MPa.

9. The article of claim 1, wherein the corrosion resistant layer has an adhesion strength of not less than 30 MPa.

10. The article of claim 1, wherein the corrosion resistant layer is deposited on the ceramic base material by thermal spraying.

11. The article of claim 1, wherein the corrosion resistant coating has an average grain size not greater than about 0.5 microns.

12. The article of claim 1 wherein the substrate consists essentially of $\alpha$alumina.

13. The article of claim 11, wherein the average grain size is not greater than about 0.3 microns.

* * * * *